(12) United States Patent
Yin et al.

(10) Patent No.: US 10,275,073 B2
(45) Date of Patent: Apr. 30, 2019

(54) ELECTRONIC WHITEBOARD AND TOUCH SENSING SIGNAL TRANSFERRING METHOD THEREOF

(71) Applicant: Coretronic Corporation, Hsin-Chu (TW)

(72) Inventors: Nan-Jiun Yin, Hsin-Chu (TW); Pen-Ning Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 288 days.

(21) Appl. No.: 15/273,714

(22) Filed: Sep. 23, 2016

(65) Prior Publication Data

US 2017/0160860 A1 Jun. 8, 2017

(30) Foreign Application Priority Data

Dec. 8, 2015 (TW) .............................. 104141070 A

(51) Int. Cl.
*G06F 3/041* (2006.01)

(52) U.S. Cl.
CPC .................................. *G06F 3/0416* (2013.01)

(58) Field of Classification Search
CPC ........... G06F 3/0416; G06F 3/041; G06F 3/14
See application file for complete search history.

(56) References Cited

U.S. PATENT DOCUMENTS

| | | | | |
|---|---|---|---|---|
| 5,790,114 A * | 8/1998 | Geaghan | ............... | G06F 3/0488 178/18.03 |
| 6,738,048 B1 * | 5/2004 | Rundel | ................ | G06F 1/3215 178/18.01 |
| 6,738,514 B1 * | 5/2004 | Shin | ..................... | G06F 3/0488 382/187 |
| 8,484,387 B2 * | 7/2013 | Kim | .................... | G06F 13/4072 710/11 |
| 8,626,932 B2 * | 1/2014 | Lydon | .................. | G06F 13/387 709/228 |
| 9,122,288 B1 * | 9/2015 | Nayak | ....................... | G05F 1/10 |
| 9,715,364 B2 * | 7/2017 | Lee | ........................ | G06F 3/1423 |
| 2011/0254795 A1 * | 10/2011 | Chen | ..................... | G06F 3/0412 345/173 |
| 2012/0050183 A1 * | 3/2012 | Lee | ........................ | G06F 3/1423 345/173 |
| 2013/0107144 A1 * | 5/2013 | Marhefka | ............. | G06F 1/3275 349/12 |
| 2015/0317028 A1 * | 11/2015 | Takahashi | ........... | G09G 3/3233 345/173 |

FOREIGN PATENT DOCUMENTS

| | | |
|---|---|---|
| CN | 203733084 | 7/2014 |
| TW | 458334 | 10/2001 |
| TW | M375924 | 3/2010 |
| TW | 201131447 | 9/2011 |
| TW | 201333758 | 8/2013 |
| TW | 201340596 | 10/2013 |

\* cited by examiner

*Primary Examiner* — Tri H Phan
(74) *Attorney, Agent, or Firm* — JCIPRNET

(57) ABSTRACT

An electronic whiteboard and a touch sensing signal transferring method thereof are provided. The electronic whiteboard includes a touch area. A first signal transmission port and a second signal transmission port are disposed on the electronic whiteboard, and a touch sensing signal detected from the touch area is transmitted to the signal transmission port coupled to a signal receiving apparatus.

14 Claims, 5 Drawing Sheets

ELECTRONIC WHITEBOARD AND TOUCH SENSING SIGNAL TRANSFERRING METHOD THEREOF

CROSS-REFERENCE TO RELATED APPLICATION

This application claims the priority benefit of Taiwan application serial no. 104141070, filed on Dec. 8, 2015. The entirety of the above-mentioned patent application is hereby incorporated by reference herein and made a part of this specification.

BACKGROUND OF THE INVENTION

1. Field of the Invention

The invention generally relates to a touch apparatus, in particular, to an electronic whiteboard and a touch sensing signal transferring method thereof.

2. Description of Related Art

Nowadays, with the development of electronic technologies and network communications technologies, interactive electronic whiteboard systems have gradually replaced conventional blackboard and whiteboard equipment, and have been widely used in classrooms, meeting rooms and other special occasions. An electronic whiteboard usually has a touch writing function, and a user can write or draw on the electronic whiteboard by using a stylus or other tools. In addition, the interactive electronic whiteboard system is generally integrated with a screen sharing function, so that data on the screen of an electronic whiteboard can be shared with the display screens of multiple electronic apparatuses in the system, or data on the screens of multiple electronic apparatuses can be gathered and displayed on a particular screen.

For the aforementioned interactive electronic whiteboard system, it is of great importance to manage electronic apparatuses connected thereto.

With the advance and development of touch technologies, touch devices have gradually become indispensable to electronic apparatuses such as notebook computers, mobile phones, tablet computers and portable multimedia players. Touch devices allow a user to perform touch operations by using gestures or an input tool such as a stylus, are easy to operate and highly intuitive, and therefore are very popular with consumers and have become a mainstream trend in the market. An electronic whiteboard with a touch function is a large-size touch device, which can be used, for example, for teaching purposes, to provide an interactive operation environment.

The electronic whiteboard features a large-size touch area. Although the electronic whiteboard can provide a touch environment that other small- and medium-sized touch apparatuses cannot provide, its large-size touch area makes it inconvenient to use. For example, signal transmission ports of the electronic whiteboard are usually disposed on only one side of the electronic whiteboard, as a result, the position for using an electronic apparatus (for example, a notebook computer or a tablet computer) connected to the electronic whiteboard is limited by the position of the signal transmission port, causing inconvenience to the user. In addition, as the dimension of the electronic whiteboard increases, an excessively long signal transmission line leads to a decrease in signal strength of a touch sensing signal, resulting in incorrect determination of the touch position.

The information disclosed in this Description of Related Art section is only for enhancement of understanding of the background of the described technology and therefore it may contain information that does not form the prior art that is already known to a person of ordinary skill in the art. Further, the information disclosed in the Description of Related Art section does not mean that one or more problems to be resolved by one or more embodiments of the invention were acknowledged by a person of ordinary skill in the art.

SUMMARY OF THE INVENTION

The invention provides an electronic whiteboard and a touch sensing signal transferring method thereof, which can improve convenience in use of the electronic whiteboard and avoid incorrect determination of the touch position.

Other objectives and advantages of the invention may be further understood from the technical features disclosed in the invention.

In order to achieve one, some, or all of the aforementioned objectives or other objectives, an embodiment of the invention provides an electronic whiteboard, including a touch unit and a signal transmission unit. The touch unit includes a touch area, and is used for detecting a touch operation in the touch area to generate a touch sensing signal. The signal transmission unit is coupled to the touch unit, the signal transmission unit includes a first signal transmission port and a second signal transmission port, and the signal transmission unit is adapted to determine whether at least one of the first signal transmission port and the second signal transmission port is coupled to a signal receiving apparatus, and transmit the touch sensing signal to the signal transmission port coupled to the signal receiving apparatus.

An embodiment of the invention provides a touch sensing signal transferring method of an electronic whiteboard. The electronic whiteboard includes a touch area and a first signal transmission port and a second signal transmission port. The touch sensing signal transferring method of the electronic whiteboard includes the following steps: determining whether at least one of the first signal transmission port and the second signal transmission port is coupled to a signal receiving apparatus; and transmitting a touch sensing signal to the signal transmission port coupled to the signal receiving apparatus.

Based on the foregoing, in the embodiments of the invention, by disposing signal transmission ports on the electronic whiteboard and transmitting the touch sensing signal to the signal transmission port coupled to the signal receiving apparatus, the problem that the position for using the signal receiving apparatus connected to the electronic whiteboard is limited by the position of the signal transmission port can be resolved. In addition, the signal strength of the touch sensing signal can be enhanced by using the signal enhancement unit disposed on the signal transmission path of the touch sensing signal, so as to alleviate the weakening of signal strength caused by an excessively long signal transmission line, thereby avoiding incorrect determination of the touch position.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
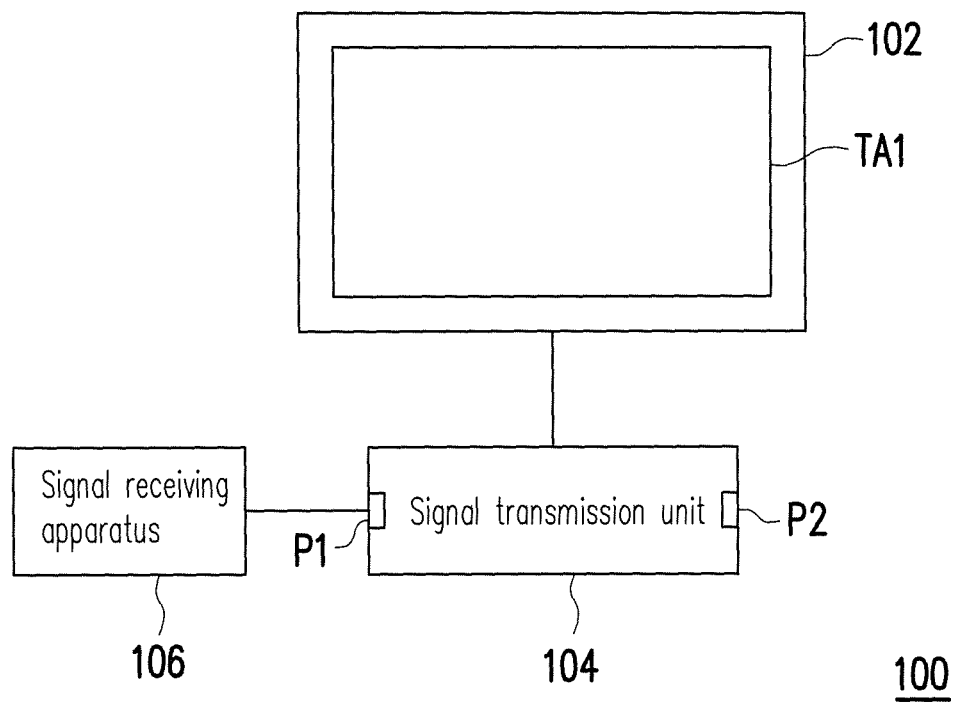
FIG. 1 is a schematic view of an electronic whiteboard according to an embodiment of the invention.

FIG. 1 is a schematic view of an electronic whiteboard according to an embodiment of the invention. Referring to FIG. 1, the electronic whiteboard 100 includes a touch unit 102 and a signal transmission unit 104. The touch unit 102 is coupled to the signal transmission unit 104. The touch unit 102 includes a touch area TA1, and is used for detecting a touch operation in the touch area to generate a touch sensing signal. The signal transmission unit 104 includes a signal transmission port P1 and a signal transmission port P2. The signal transmission port P1 and the signal transmission port P2 may be coupled to a signal receiving apparatus 106 respectively, so that the signal transmission unit 104 transmits a touch sensing signal to the signal receiving apparatus 106 through the signal transmission port P1 or the signal transmission port P2, and the signal receiving apparatus 106 determines a touch position of the corresponding touch operation. The signal receiving apparatus 106 may be, for example, a desktop computer, a notebook computer, a tablet computer, a smart phone or other suitable electronic apparatuses. The signal transmission port P1 and the signal transmission port P2 may be, for example, universal serial bus (USB) transmission ports or other suitable transmission ports, but the invention is not limited thereto.

Figure 2:
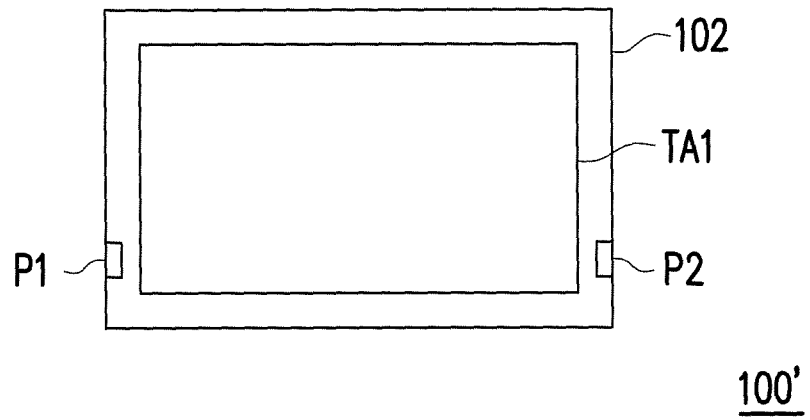
FIG. 2 is a schematic view of an electronic whiteboard according to another embodiment of the invention.

In another embodiment of the invention, as shown by the electronic whiteboard 100' in FIG. 2, the signal transmission port P1 and the signal transmission port P2 may be respectively disposed on two opposite sides of the touch area TA1. Compared with the signal transmission unit 104 in FIG. 1, the signal transmission unit 104 in FIG. 2 may be disposed in the electronic whiteboard 102, and only the signal transmission port P1 and the signal transmission port P2 are exposed. Therefore, the positions of the signal transmission port P1 and the signal transmission port P2 in actual applications are not limited in the invention.

Referring to FIG. 1 again, further, the signal transmission unit 104 can determine whether at least one of the signal transmission port P1 and the second signal transmission port P2 is coupled to the signal receiving apparatus 106, and transmit the touch sensing signal to the signal receiving apparatus 106 through the signal transmission port P1 or P2 coupled to the signal receiving apparatus 106. In the embodiment, the signal receiving apparatus 106 is coupled to the signal transmission port P1, and the signal transmission unit 104 can transmit the touch sensing signal to the signal receiving apparatus 106 through the signal transmission port P1. Compared with the prior art in which the position for using an electronic apparatus connected to the electronic whiteboard is limited by the position of the signal transmission port and the electronic apparatus can be coupled to only one side of the touch area, in the invention, by disposing the signal transmission ports P1 and P2 on opposite sides of the touch area TA1 and transmitting the touch sensing signal to the signal receiving apparatus 106 through the signal transmission port coupled to the signal receiving apparatus 106, the position for using the signal receiving apparatus 106 connected to the electronic whiteboard 100 may not be limited by the position of the signal transmission port, thus convenience in use of the electronic whiteboard 100 can be effectively improved.

In another embodiment, if the signal transmission port P1 is coupled to the signal receiving apparatus 106 and the signal transmission port P2 is coupled to another signal receiving apparatus, the signal transmission unit 104 transmits the touch sensing signal to the signal transmission port P1. That is, when the electronic whiteboard 100 is coupled to two signal receiving apparatuses at the same time, the priority of one signal transmission port for transmitting the touch sensing signal may be set to be higher than the priority of the other signal transmission port for transmitting the touch sensing signal. For example, the signal transmission unit 104 may determine whether the signal transmission ports P1 and P2 are connected to the signal receiving apparatus by detecting whether power supply pins of the signal transmission ports P1 and P2 receive a power supply signal.

Figure 3:
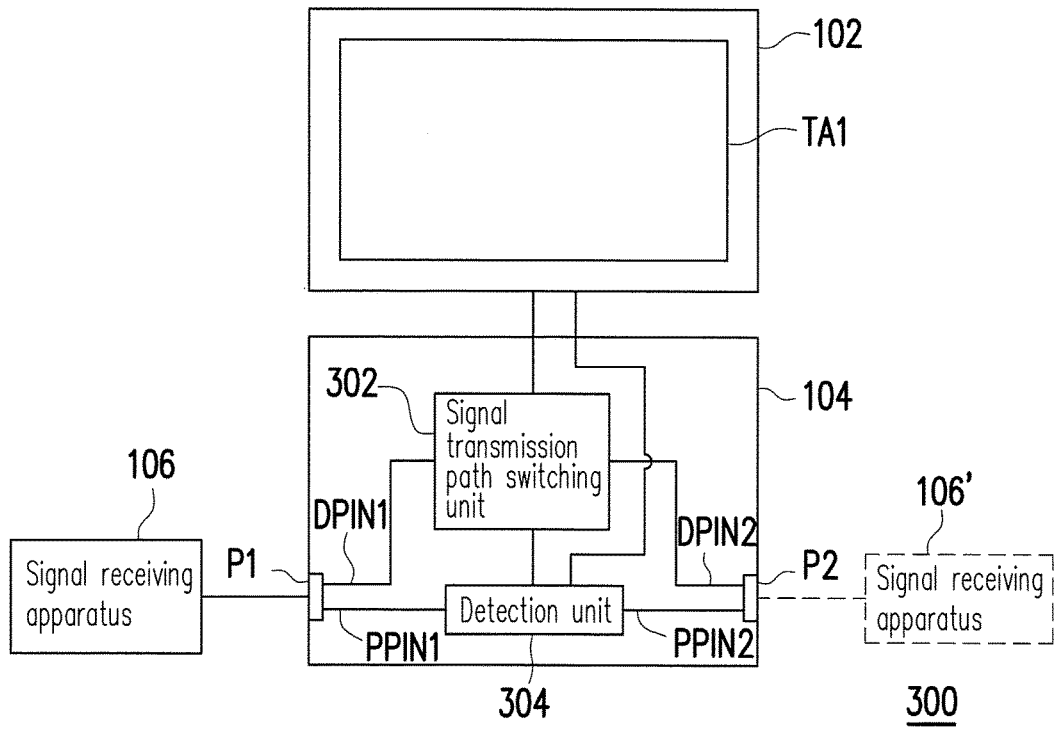
FIG. 3 is a schematic view of an electronic whiteboard according to another embodiment of the invention.

FIG. 3 is a schematic view of an electronic whiteboard according to another embodiment of the invention. Referring to FIG. 3, the electronic whiteboard 300 is similar to the electronic whiteboard 100, where the same reference numbers are used to refer to the same parts, and the descriptions thereof are omitted herein. The electronic whiteboard 300 of the embodiment is different from the electronic whiteboard 100 in that the signal transmission unit 104 further includes a signal transmission path switching unit 302 and a detection unit 304, where the signal transmission path switching unit 302 is coupled to the touch unit 102, the detection unit 304, the signal transmission port P1 and the signal transmission port P2, and the detection unit 304 is further coupled to the touch unit 102, the signal transmission port P1 and the signal transmission port P2. The signal transmission path switching unit 302 and the detection unit 304 are, for example, an existing switching circuit and detection chip that are applied to an external power supply and an internal battery of a notebook computer, which is not limited in the invention. The detection unit 304 can detect whether at least one of the power supply pins PPIN1 and PPIN2 of the signal transmission port P1 and the signal transmission port P2 receives a power supply signal from the signal receiving apparatus 106. If the detection unit 304 receives the power supply signal, the detection unit 304 provides the power supply signal to the touch unit 102 for use as an operating voltage, and controls the signal transmission path switching unit 302 to switch a signal transmission path of the touch sensing signal to transmission to the signal transmission port that receives the power supply signal. For example, when only the signal transmission port P1 receives the power supply signal from the signal receiving apparatus 106, the detection unit 304 controls the signal transmission path switching unit 302 to transmit the touch sensing signal to a data transmission pin DPIN1 of the signal transmission port P1. Similarly, if only the signal transmission port P2 receives a power supply signal from another signal receiving apparatus 106', the detection unit 304 controls the signal transmission path switching unit 302 to transmit the touch sensing signal to a data transmission pin DPIN2 of the signal transmission port P2. In addition, if the signal transmission port P1 and the signal transmission port P2 respectively receive the power supply signals from the signal receiving apparatus 106 and the signal receiving apparatus 106' at the same time, the detection unit 304 may control the signal transmission path switching unit 302 to transmit the touch sensing signal to the signal transmission port with a higher priority, for example, the signal transmission port P1, so as to avoid interference between the signal receiving apparatus 106 and the signal receiving apparatus 106'. In another embodiment, the detection unit 304 may control the signal transmission path switching unit 302 to transmit the touch sensing signal to the signal transmission port P2, but the invention is not limited thereto.

Figure 4:
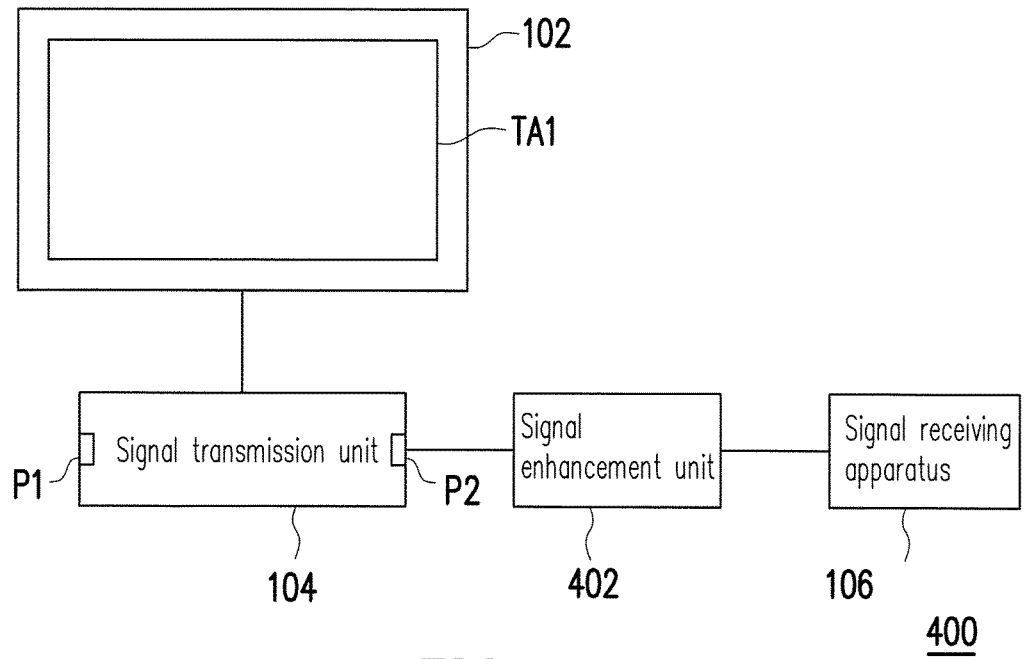
FIG. 4 is a schematic view of an electronic whiteboard according to another embodiment of the invention.

FIG. 4 is a schematic view of an electronic whiteboard according to another embodiment of the invention. Refer to FIG. 4. In the embodiment, the electronic whiteboard 400 is similar to the electronic whiteboard 100 of the embodiment in FIG. 1, where the same reference numbers are used to refer to the same parts, and the descriptions thereof are omitted herein. The electronic whiteboard 400 is different from the electronic whiteboard 100 in that the electronic whiteboard 400 further includes a signal enhancement unit 402, and the signal transmission unit 104 may be coupled to the signal receiving apparatus 106 through the signal enhancement unit 402. As shown in FIG. 4, the signal enhancement unit 402 may be, for example, coupled between the signal transmission port P2 and the signal receiving apparatus 106 (in other embodiments, the signal enhancement unit 402 may be coupled between the signal transmission port P1 and the signal receiving apparatus 106, but the invention is not limited thereto). The signal enhancement unit 402 can enhance signal strength outputted by the signal transmission port P2, that is, signal strength of the touch sensing signal, to alleviate the weakening of signal strength caused by an excessively long signal transmission line, so that the signal receiving apparatus 106 can determine the touch position more accurately according to the touch sensing signal, thereby avoiding incorrect determination of the touch position. Those skilled in the art should know that the signal enhancement unit 402 may be, for example, embodied as a signal enhancement circuit to enhance the outputted signal strength.

Figure 5:
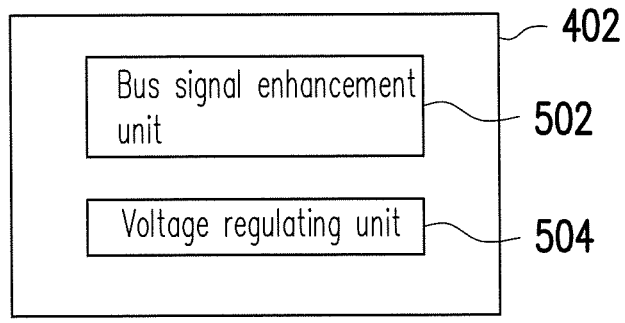
FIG. 5 is a schematic view of a signal enhancement unit according to an embodiment of the invention.

FIG. 5 is a schematic view of a signal enhancement unit according to an embodiment of the invention. Refer to FIG. 5. In the embodiment, the signal enhancement unit 402 is adapted to connect to at least one of the signal transmission port P1 and the signal transmission port P2. For example, the signal enhancement unit 402 includes a bus signal enhancement unit 502 and a voltage regulating unit 504. The bus signal enhancement unit 502 is, for example, a signal amplifier circuit, and the voltage regulating unit 504 is, for example, a voltage regulating circuit commonly used by those skilled in the art, which is not limited in the invention. When the signal transmission port P1 or the signal transmission port P2 is, for example, a universal serial bus transmission port, the bus signal enhancement unit 502 may be, for example, a universal bus signal enhancement unit. The bus signal enhancement unit 502 can be used to enhance the signal strength transmitted by the signal transmission port P1 and the signal transmission port P2 (for example, enhance the strength of a signal from the data transmission pin), and the voltage regulating unit can perform voltage regulation on the power supply signal provided to the power supply pins of the signal transmission port P1 and the signal transmission port P2, so as to avoid unstable signals caused by an excessively long signal transmission path between the signal receiving apparatus 106 and the electronic whiteboard 100.

Figure 6:
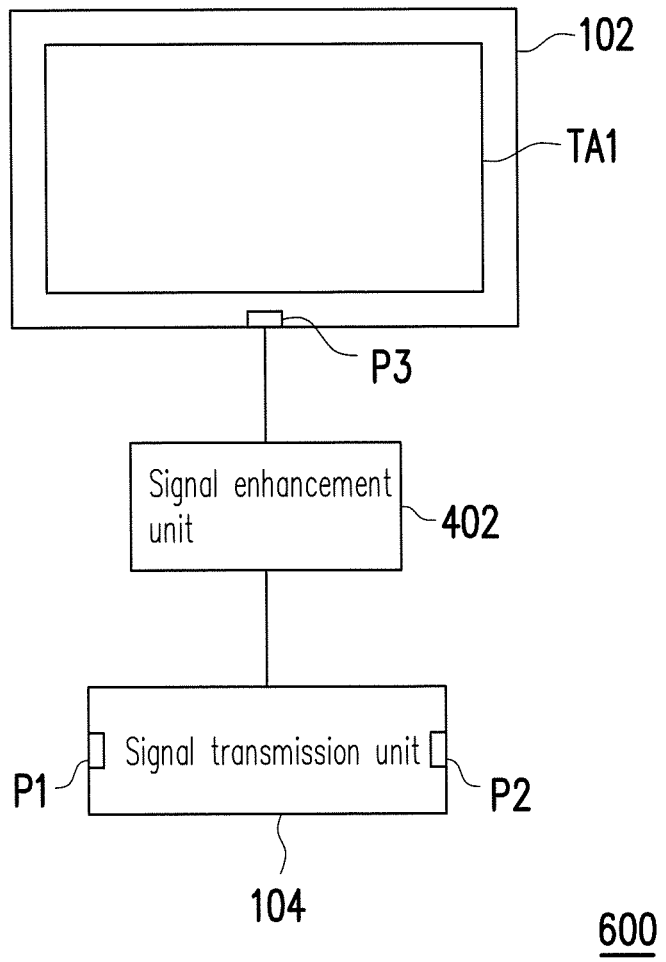
FIG. 6 is a schematic view of an electronic whiteboard according to another embodiment of the invention.

It should be noted that the signal enhancement unit 402 is not limited to being coupled to the signal transmission port P1 or P2, as long as the signal enhancement unit 402 is disposed on the signal transmission path of the touch sensing signal. As shown in FIG. 6, the electronic whiteboard 600 is similar to the electronic whiteboard 400, where the same reference numbers are used to refer to the same parts, and the descriptions thereof are omitted herein. The electronic whiteboard 600 is different from the electronic whiteboard 400 in that the touch unit 102 of the electronic whiteboard 600 may include a signal transmission port P3 (which is, for example, but not limited to, a universal serial bus signal transmission port), the signal enhancement unit 402 is coupled between the signal transmission port P3 and the signal transmission unit 104, and the touch sensing signal provided by the touch unit 102 is first amplified by the signal enhancement unit 402 and then outputted to the signal transmission unit 104, thereby alleviating the weakening of signal strength caused by an excessively long signal transmission line. In addition, in some embodiments, the signal enhancement unit 402 may be disposed in the touch unit 102 or the signal transmission unit 104, but the invention is not limited thereto.

Figure 7:
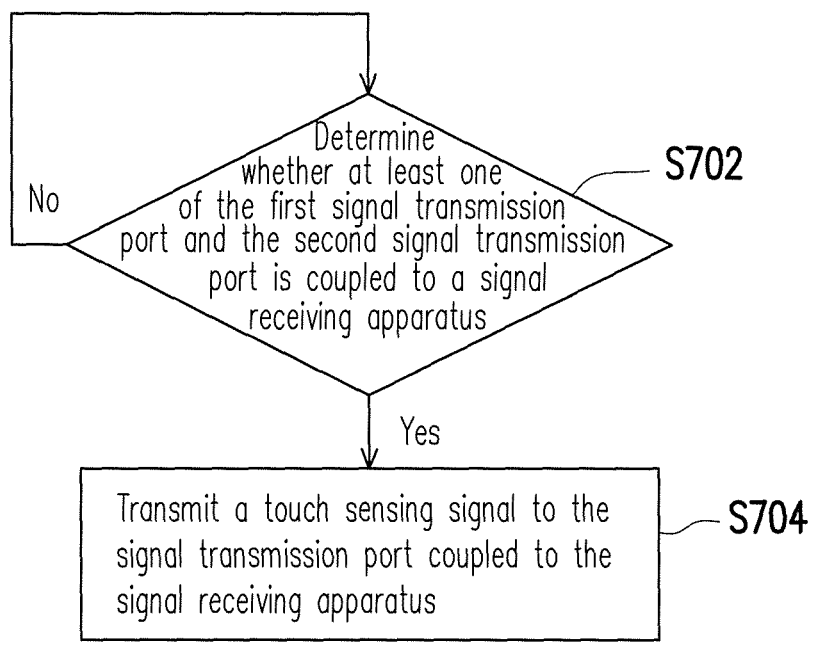
FIG. 7 is a flowchart of a touch sensing signal transferring method of an electronic whiteboard according to an embodiment of the invention.

FIG. 7 is a flowchart of a touch sensing signal transferring method of an electronic whiteboard according to an embodiment of the invention. Refer to FIG. 7. The electronic whiteboard includes a touch area and a first signal transmission port and a second signal transmission port that are disposed on opposite sides of the touch area. It can be known from the foregoing embodiments that the touch sensing signal transferring method of the electronic whiteboard may include the following steps. First, it is determined whether at least one of the first signal transmission port and the second signal transmission port is coupled to a signal receiving apparatus (step S702). The first signal transmission port and the second signal transmission port may be, for example, but not limited to, universal serial bus transmission ports. If at least one of the first signal transmission port and the second signal transmission port is coupled to the signal receiving apparatus, a touch sensing signal is transmitted to the signal transmission port coupled to the signal receiving apparatus (step S704). On the contrary, if neither of the first signal transmission port and the second signal transmission port is coupled to the signal receiving apparatus, continue to perform the step S702. Whether the first signal transmission port and the second signal transmission port are coupled to the signal receiving apparatus may be determined by, for example, detecting whether power supply pins of the first signal transmission port and the second signal transmission port receive a power supply signal. If it is detected that the power supply pin receives the power supply signal, a signal transmission path of the touch sensing signal is switched to transmission to the signal transmission port that receives the power supply signal.

Figure 8:
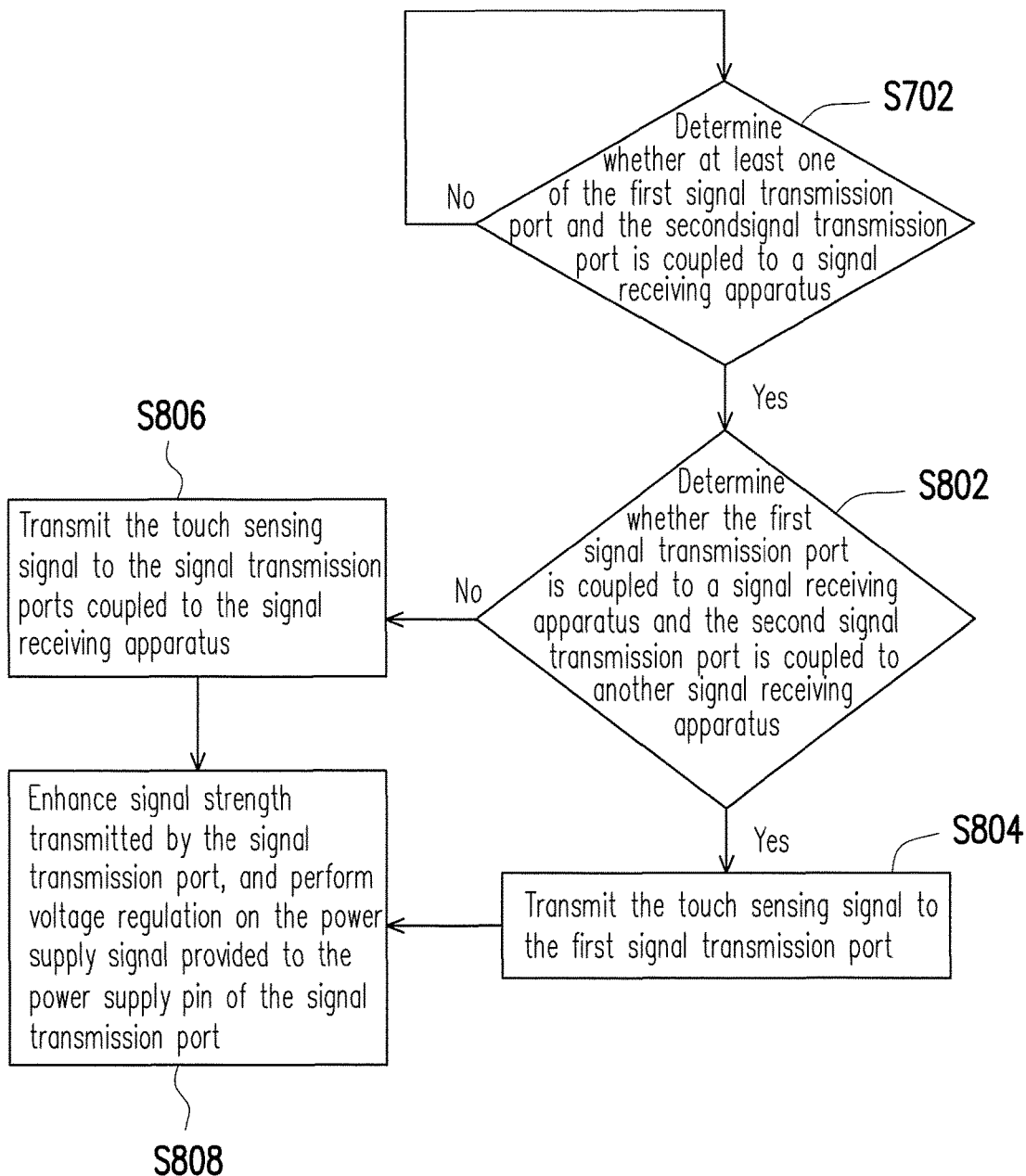
FIG. 8 is a flowchart of a touch sensing signal transferring method of an electronic whiteboard according to another embodiment of the invention.

FIG. 8 is a flowchart of a touch sensing signal transferring method of an electronic whiteboard according to another embodiment of the invention. Refer to FIG. 8. In the embodiment, if it is determined in the step S702 that at least one of the first signal transmission port and the second signal transmission port is coupled to the signal receiving apparatus, it may be further determined whether the first signal transmission port is coupled to a signal receiving apparatus and the second signal transmission port is coupled to another signal receiving apparatus (step S802). If the first signal transmission port is coupled to a signal receiving apparatus and the second signal transmission port is coupled to another signal receiving apparatus, the touch sensing signal is transmitted to the first signal transmission port (step S804). That is, the signal transmission priority of the first signal transmission port is set to be higher than that of the second signal transmission port, but the invention is not limited thereto. In other embodiments, the signal transmission priority of the second signal transmission port may be set to be higher than that of the first signal transmission port. Whether the first signal transmission port and the second signal transmission port are coupled to the signal receiving apparatus may be determined by, for example, determining whether power supply pins of the first signal transmission port and the second signal transmission port receive a power supply signal. For example, if the power supply pins of the first signal transmission port and the second signal transmission port both receive the power supply signal, the signal transmission path of the touch sensing signal is switched to transmission to the first signal transmission port.

On the contrary, if it is determined in the step S802 that both the first signal transmission port and the second signal transmission port are coupled to the signal receiving apparatus, the touch sensing signal is transmitted to the signal transmission ports coupled to the signal receiving apparatus (step S806). In addition, in some embodiments, to alleviate the weakening of signal strength caused by an excessively long signal transmission line, signals outputted by the first signal transmission port and the second signal transmission port may further be enhanced. For example, in the embodiment, after the steps S804 and S806, signal strength transmitted by at least one of the first signal transmission port and the second signal transmission port is enhanced, and voltage regulation is performed on the power supply signal provided to the power supply pin of the signal transmission port (step S808). Thus, the touch position can be determined more accurately according to the touch sensing signal, thereby avoiding incorrect determination of the touch position.

Based on the foregoing, in the embodiments of the invention, by disposing signal transmission ports on opposite sides of the electronic whiteboard and transmitting the touch sensing signal to the signal transmission port coupled to the signal receiving apparatus, the problem that the position for using the signal receiving apparatus connected to the electronic whiteboard is limited by the position of the signal transmission port can be resolved. In addition, the signal strength of the touch sensing signal can be enhanced by using the signal enhancement unit disposed on the signal transmission path of the touch sensing signal, so as to alleviate the weakening of signal strength caused by an excessively long signal transmission line, thereby avoiding incorrect determination of the touch position.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An electronic whiteboard, comprising:
   a touch unit, comprising a touch area, and used for detecting a touch operation in the touch area to generate a touch sensing signal; and
   a signal transmission unit, coupled to the touch unit, wherein the signal transmission unit comprises a first signal transmission port and a second signal transmission port, and the signal transmission unit determines whether at least one of the first signal transmission port and the second signal transmission port is coupled to a signal receiving apparatus, and transmits the touch sensing signal to at least one of the first signal transmission port and the second signal transmission port coupled to the signal receiving apparatus,
   wherein if the first signal transmission port is coupled to the signal receiving apparatus and the second signal transmission port is coupled to another signal receiving apparatus, the signal transmission unit transmits the touch sensing signal to the first signal transmission port.

2. The electronic whiteboard according to claim 1, wherein the first signal transmission port and the second signal transmission port are respectively disposed on opposite sides of the touch area.

3. The electronic whiteboard according to claim 1, wherein the first signal transmission port and the second signal transmission port are universal serial bus transmission ports, and the signal transmission unit detects whether power supply pins of the first signal transmission port and the second signal transmission port receive a power supply signal, to determine whether the first signal transmission port and the second signal transmission port are coupled to the signal receiving apparatus.

4. The electronic whiteboard according to claim 3, wherein the signal transmission unit comprises:
   a signal transmission path switching unit, coupled to the touch unit, and used for transmitting the touch sensing signal to the first signal transmission port or the second signal transmission port; and
   a detection unit, coupled to the signal transmission path switching unit and the touch unit, and used for detecting whether the power supply pin of at least one of the first signal transmission port and the second signal transmission port receives the power supply signal, and if the power supply signal is received, providing the power supply signal to the touch unit, and controlling the signal transmission path switching unit to switch a signal transmission path of the touch sensing signal to transmission to the at least one of the first signal transmission port and the second signal transmission port that receives the power supply signal.

5. The electronic whiteboard according to claim 4, wherein if the power supply pins of the first signal transmission port and the second signal transmission port both receive the power supply signal, the detection unit controls the signal transmission path switching unit to switch the signal transmission path of the touch sensing signal to transmission to the first signal transmission port.

6. The electronic whiteboard according to claim 3, further comprising:
   a signal enhancement unit, disposed on a signal transmission path of the touch sensing signal to enhance signal strength transmitted by at least one of the first signal transmission port and the second signal transmission port.

7. The electronic whiteboard according to claim 6, wherein the touch unit further comprises a third signal transmission port, the signal enhancement unit is coupled between the third signal transmission port and the signal transmission unit, and the third signal transmission port is a universal serial bus transmission port.

8. The electronic whiteboard according to claim 7, wherein the signal enhancement unit is disposed in the touch unit or the signal transmission unit.

9. The electronic whiteboard according to claim 6, wherein the signal enhancement unit is coupled between the first signal transmission port and the signal receiving apparatus or between the second signal transmission port and the signal receiving apparatus.

10. The electronic whiteboard according to claim 6, wherein the signal enhancement unit comprises:
    a bus signal enhancement unit, for enhancing the signal strength transmitted by at least one of the first signal transmission port and the second signal transmission port; and
    a voltage regulating unit, for performing voltage regulation on the power supply signal provided to the power supply pin of at least one of the first signal transmission port and the second signal transmission port.

11. A touch sensing signal transferring method of an electronic whiteboard, wherein the electronic whiteboard comprises a touch area and a first signal transmission port and a second signal transmission port, the touch sensing signal transferring method of the electronic whiteboard comprising:
    determining whether at least one of the first signal transmission port and the second signal transmission port is coupled to a signal receiving apparatus;
    transmitting a touch sensing signal to at least one of the first signal transmission port and the second signal transmission port coupled to the signal receiving apparatus;
    determining whether the first signal transmission port is coupled to the signal receiving apparatus and the second signal transmission port is coupled to another signal receiving apparatus; and
    if the first signal transmission port is coupled to the signal receiving apparatus and the second signal transmission port is coupled to another signal receiving apparatus, transmitting the touch sensing signal to the first signal transmission port.

12. The touch sensing signal transferring method of the electronic whiteboard according to claim 11, wherein the first signal transmission port and the second signal transmission port are universal serial bus transmission ports, and the touch sensing signal transferring method of the electronic whiteboard comprises:
    detecting whether power supply pins of the first signal transmission port and the second signal transmission port receive a power supply signal; and
    switching a signal transmission path of the touch sensing signal to transmission to at least one of the first signal transmission port and the second signal transmission port that receives the power supply signal.

13. The touch sensing signal transferring method of the electronic whiteboard according to claim 12, comprising:
    determining whether the power supply pins of the first signal transmission port and the second signal transmission port both receive the power supply signal; and
    if the power supply pins of the first signal transmission port and the second signal transmission port both receive the power supply signal, switching the signal transmission path of the touch sensing signal to transmission to the first signal transmission port.

14. The touch sensing signal transferring method of the electronic whiteboard according to claim 12, comprising:
    enhancing signal strength transmitted by at least one of the first signal transmission port and the second signal transmission port, and performing voltage regulation on the power supply signal provided to the power supply pin of at least one of the first signal transmission port and the second signal transmission port.

* * * * *